(No Model.)
C. H. POPE.
PIPE COUPLING.
No. 269,597. Patented Dec. 26, 1882.
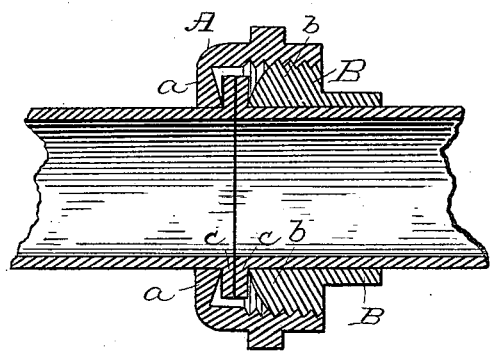
Attest:
Walter Malston
F. L. Middleton
Inventor.
Charles H. Pope
by Elis Spear
Atty.

UNITED STATES PATENT OFFICE.

CHARLES H. POPE, OF THOMASTON, MAINE.

PIPE-COUPLING.

SPECIFICATION forming part of Letters Patent No. 269,597, dated December 26, 1882.

Application filed March 22, 1882. (No model.)

*To all whom it may concern:*

Be it known that I, CHAS. H. POPE, of Thomaston, in the county of Knox and State of Maine, have invented a new and useful Improvement in Pipe-Couplings; and I do hereby declare that the following is a full, clear, and exact description of the same.

My invention relates to the coupling of lead pipes, although it is applicable to any kind of pipe the material of which is such that the end may be flared out or upset to form a flange, in connection with which my coupling is specially adapted to operate.

The object of my invention is to produce a simple and cheap form of coupling capable of forming a tight connection without packings or gaskets of any kind.

In the accompanying drawing, the figure represents a longitudinal section taken centrally through the coupling, with the ends of the pipe in position.

The coupling is composed of two parts, each adapted to fit closely over the pipe. The part A is in the form of a cup, having an external polygonal surface for convenience in turning. It is threaded internally, and the perforation in the bottom of the cup leaves a flange, which is preferably turned down to form an edge, $a$. The part B is threaded externally to fit accurately within the part A. The inner end is preferably beveled to form a flange, $b$, and the other end is also made with a polygonal external surface. These parts are slipped upon the meeting ends of the pipe in the position shown in the figure. The ends of the pipe-sections are upset, as shown at $c\ c$, to form flanges at right angles to the pipe itself. After these ends have been upset they may be made smooth by grinding, filing, or in any convenient way until they fit accurately to each other. The parts of the coupling are then brought together and the edges $a$ and $b$ bear against the rear of the flanges. By turning the parts they are forced together, the sharp edges entering the flanges or compressing them, so as to force them together, and forming an accurate fit.

When ordinary lead pipe is used the pressure applied may bring the two flanged ends of the pipe so firmly together that no water can escape at the junction; but if any should escape it is held within the coupling by the joint formed by the sharp edges $a\ b$ with the rear surface of the flanges. Thus no packing is required, and a perfectly-tight joint is formed in a very simple manner as the edges $a$ and $b$ enter the flange, and without any of the ordinary means of packing prevent the escape of water through the junction to the outside.

I claim—

The combination, with the pipe ends having upset flanges $c\ c$, of the connected clamping-pieces A B, having the inclined or beveled edges $a\ b$, substantially as described.

In testimony whereof I have signed my name to this specification in the presence of two subscribing witnesses.

CHARLES H. POPE.

Witnesses:
E. A. ROBINSON,
S. S. GARRY.